US006994351B2

(12) United States Patent
Van Norman

(10) Patent No.: US 6,994,351 B2
(45) Date of Patent: Feb. 7, 2006

(54) MECHANICAL SEAL DEVICE AND METHOD FOR A SCRAPED SURFACE HEAT EXCHANGER

(75) Inventor: Drew Van Norman, Whitewater, WI (US)

(73) Assignee: SPX Corporation, Charlotte, NC (US)

(*) Notice: Subject to any disclaimer, the term of this patent is extended or adjusted under 35 U.S.C. 154(b) by 115 days.

(21) Appl. No.: 10/693,950

(22) Filed: Oct. 28, 2003

(65) Prior Publication Data

US 2005/0087932 A1 Apr. 28, 2005

(51) Int. Cl.
*F16J 15/34* (2006.01)

(52) U.S. Cl. ........................................ 277/372; 277/306

(58) Field of Classification Search ................. 277/372, 277/373, 306

See application file for complete search history.

(56) References Cited

U.S. PATENT DOCUMENTS

| | | | | | |
|---|---|---|---|---|---|
| 2,037,144 | A | * | 4/1936 | Olson | 277/398 |
| 2,667,388 | A | * | 1/1954 | Schick | 384/481 |
| 2,685,464 | A | * | 8/1954 | Murphy | 277/398 |
| 3,475,033 | A | * | 10/1969 | Voitik | 277/387 |
| 3,836,157 | A | * | 9/1974 | Hummer | 277/366 |
| 4,304,408 | A | * | 12/1981 | Greenawalt | 277/373 |
| 4,448,428 | A | * | 5/1984 | Marsi | 277/404 |
| 5,116,066 | A | * | 5/1992 | Crawford | 277/384 |

* cited by examiner

*Primary Examiner*—Alison K. Pickard
(74) *Attorney, Agent, or Firm*—Baker & Hostetler LLP

(57) ABSTRACT

A sealing method and apparatus is provided for sealing between a rotating shaft and a fixed housing such as found in scraped surface heat exchangers. The sealing apparatus and method includes a sealed cartridge where a gland and a trapped seal ring can be releaseably assembled so that in a fully assembled configuration the gland and the trapped seal ring rotate together and are rotationally connected by a ball trapped between an indentation in the gland and an indentation in the trapped seal ring.

8 Claims, 5 Drawing Sheets

MECHANICAL SEAL DEVICE AND METHOD FOR A SCRAPED SURFACE HEAT EXCHANGER

FIELD OF THE INVENTION

The invention pertains generally to sealing devices and methods for sealing a rotating member against a fixed non-rotating housing. More particularly, the invention relates to a sealing device and method for use in a scraped surface heat exchanger having a central rotating tube and a fixed non-rotating outer housing.

BACKGROUND OF THE INVENTION

Materials handling industries, and particularly the food processing industry, often use a device referred to as a scraped surface heat exchanger. A scraped surface heat exchanger generally features a tubular outer housing which surrounds a rotating central shaft. The rotating central shaft has hingedly connected paddles that extend angularly radially outward and contact the inside surface of the outer housing as the central shaft rotates. The outer housing has a material inlet at one end and a material outlet at the other end and the material being processed is pumped through so that it passes along the length of the heat exchanger from the inlet to the outlet.

The outer housing is typically heated or cooled so that the material will undergo a change of temperature as it passes through the scraped surface heat exchanger. Further, the paddles help agitate the material and/or scrape it off the inside surface of the heat exchanger as desired.

Since the scraped surface heat exchanger essentially has a single longitudinal rotating shaft, it is typical to suspend the shaft at each end of the housing via a roller or ball bearing arrangement at the housing at each end of the shaft and each respective end of the housing. It is typically desirable to provide a seal so that the material does not come into contact with these roller bearings. Providing such a seal between the shaft and the housing is desirable to isolate the bearings from the material so that the bearings do not become clogged, to permit lubrication of the bearings, and/or to permit cleaning of the bearings by separating the bearings from the material. Further, preventing the food product from contacting the bearings also enhances the cleanliness of the food product so that it is not contaminated by materials associated with the bearings.

The known seal arrangements for sealing between the inside of the housing and the rotating central tube have some disadvantages however. In particular the seals tend to be somewhat complex and difficult to assemble and disassemble. Also, some known arrangements require a set screw to project completely through the outer housing in order to retain some non-rotating components of the seal in place.

Accordingly, there is a need in the art for a seal and sealing method which can alleviate the above mentioned disadvantages at least to some extent, and which can in some embodiments provide desirable sealing qualities between a rotating shaft and a non-rotating housing, while being simple and easy to assemble and disassemble.

SUMMARY OF THE INVENTION

The present invention provides an apparatus and method for sealing a rotating member against a fixed non-rotating housing, which in some embodiments provides desirable sealing qualities between the rotating shaft and the non-rotating housing, while being simple and easy to assembly and disassemble.

In accordance with one embodiment of the present invention, an apparatus for sealing between a rotating shaft and a fixed housing, comprising a rotating seal having a first face, mounted for rotation with the shaft, a non-rotating trapped seal ring having a second face sliding contact with the first sealed face and biased towards the first face by a spring, a gland fixedly mounted to the housing so that the spring is located between the gland and the trapped seal ring, and a ball disposed between the trapped seal ring and the gland and providing a lock against rotation so that the trapped seal ring remains rotationally fixed relative to the fixed gland.

In accordance with another embodiment of the present invention, an apparatus for sealing between a rotating shaft and a fixed housing, comprising a rotating sealing means having a first face mounted for rotation with the shaft, a non-rotating sealing means trapped seal ring having a second face and sliding contact with the first face and biased towards the first face by a housing means, a gland fixedly mounted to the housing so that the housing means is located between the gland and the trapped seal ring, and locking means disposed between the trapped seal ring and the gland and providing a lock against rotation so that the trapped seal ring remains rotationally fixed relative to the fixed gland.

In accordance with yet still another embodiment of the present invention, A method for a sealing between a rotating shaft and fixed housing, comprising biasing a non-rotating seal face into sliding contact against a seal face rotating with the shaft using a spring; and locking the non-rotating seal face against rotation by insertion of a ball trapped between an indentation in a trapped seal ring and an indentation in a gland attached to the housing.

In accordance with still another embodiment of the present invention, a method for a sealing between a rotating and fixed housing discussed above wherein the spring is a wave spring.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention provides a seal and sealing method which can in some embodiments provide desirable sealing qualities between a rotating shaft and a non-rotating housing, while being simple and easy to assembly and disassemble. Preferred embodiments of the invention will now be described with reference to the drawings figures, in which like referenced numerals refer to like elements throughout.

Figure 1:
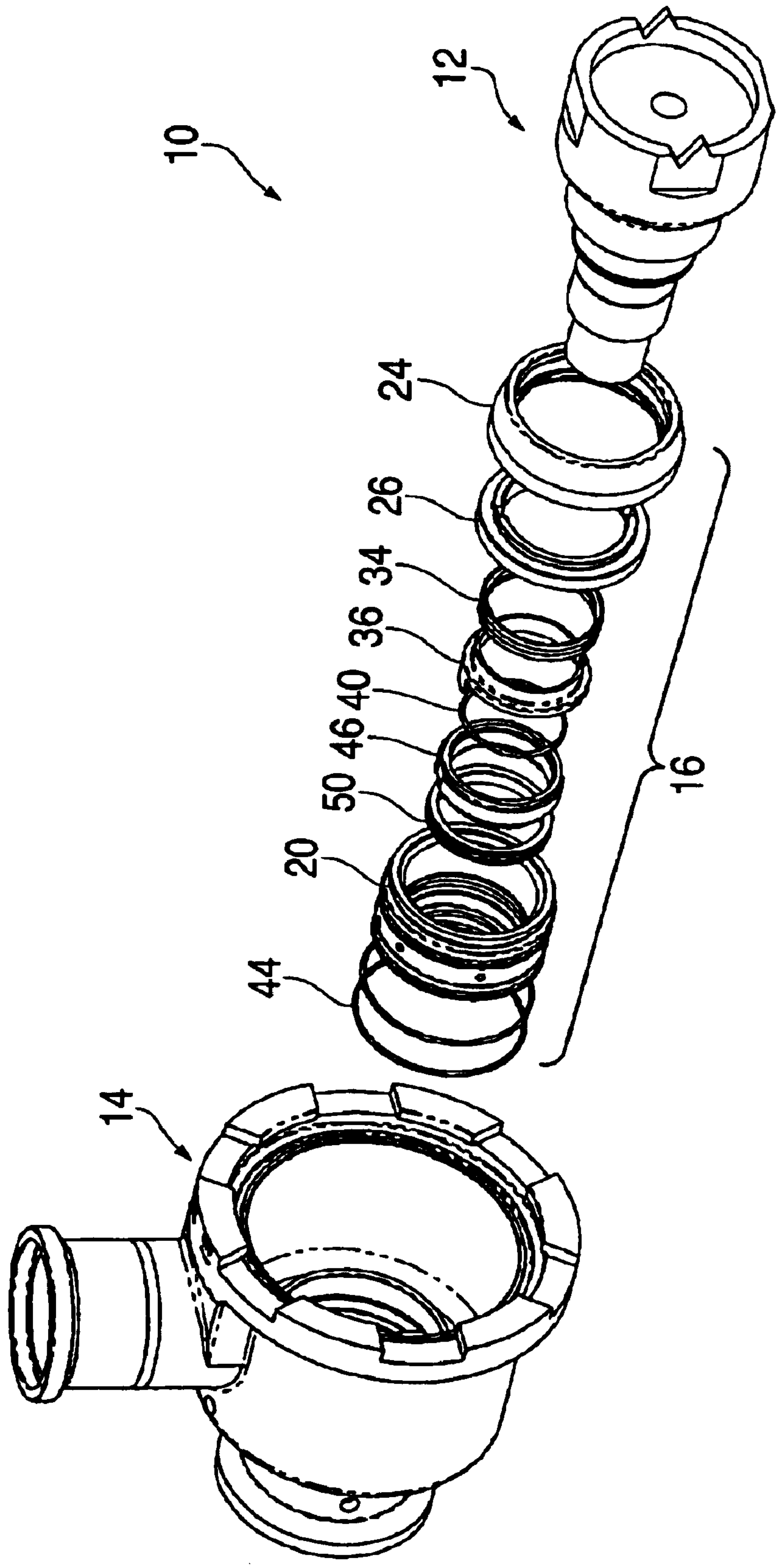
FIG. 1 is an exploded view of a seal assembly and associated components along with a cut-a-way portion showing a central rotating shaft and an end portion of a housing of a scraped surface heat exchanger, according to a preferred embodiment of the invention.
Figure 2:
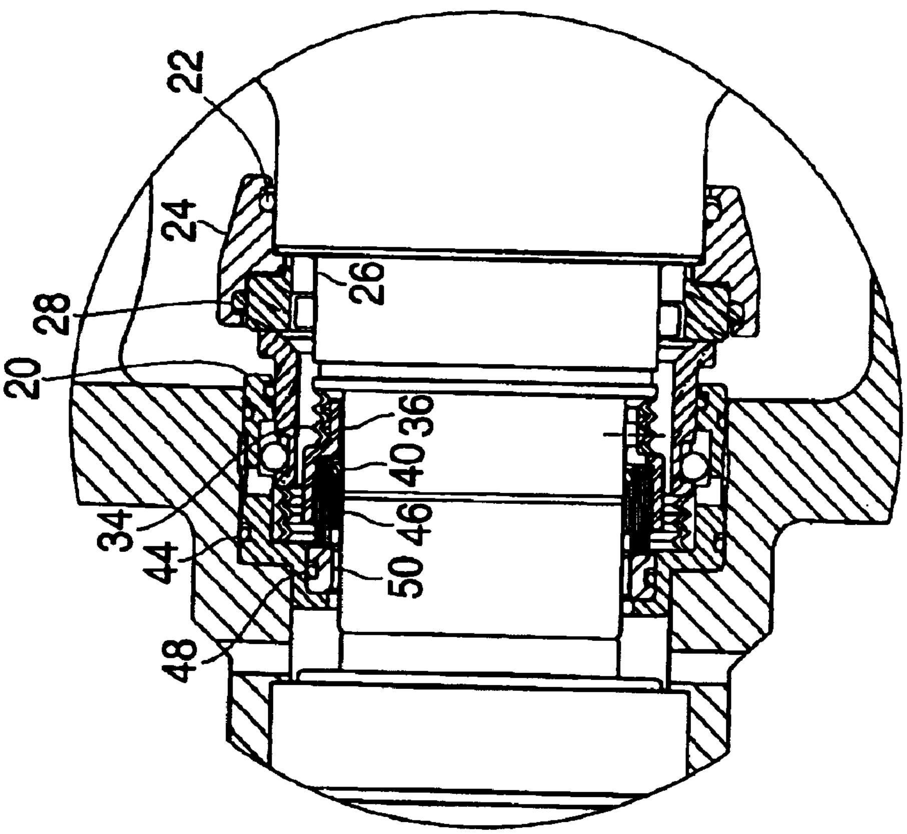
FIG. 2 is a detailed view of the assembled seal arrangement, also showing the shaft in the end of the housing as in FIG. 1.
Figure 3:
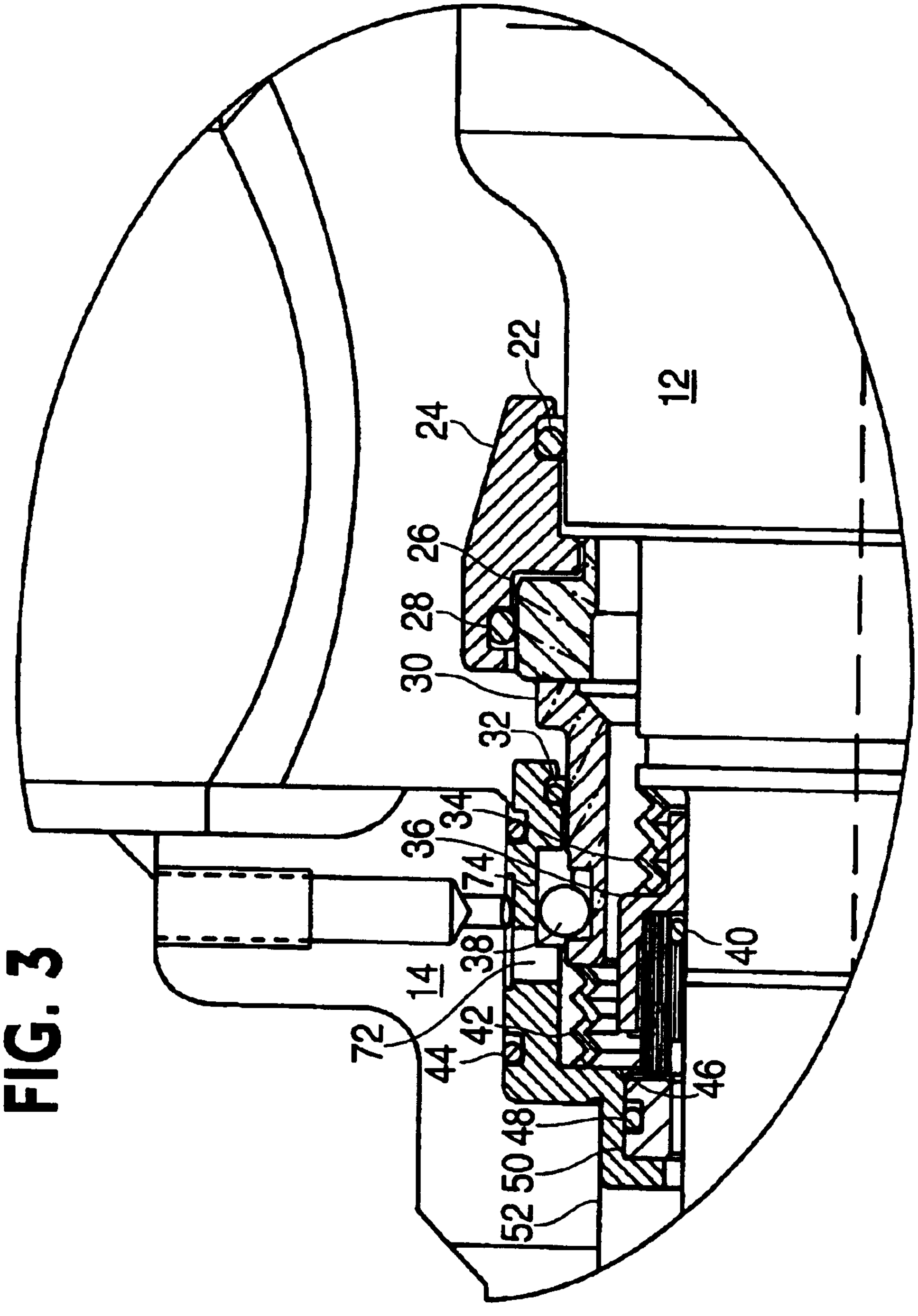
FIG. 3 is a detailed view showing the components illustrated in FIG. 2.

FIG. 1 is an exploded view of a seal assembly and associated components along with a cut-a-way portion showing a central rotating shaft and an end portion of a housing of a scraped surface heat exchanger, according to a preferred embodiment of the invention. FIG. 2 is a detailed view of the assembled seal arrangement, also showing the shaft in the end of the housing as in FIG. 1. FIG. 3 is a detailed view showing the components illustrated in FIG. 2. Referring now to FIGS. 1–3 it will be appreciated that a seal apparatus, generally designated 10, is provided to provide a seal between a rotating central shaft 12 and the inside of a housing and 14. A seal cartridge assembly 20 and other associated components are used as part of the seal.

Turning particularly to FIG. 3, an O-ring 22 surrounds a portion of the rotating shaft 12. A seal ring 24 also surrounds the shaft 12 as well as the O-ring 20, and rests on a seat 26, while also trapping an O-ring 28. The seat 26 is keyed to the shaft is to rotate with the shaft 12. It will be appreciated that the O-ring 22, seal ring 24, seat 26, and O-ring 28 all rotate together with the shaft 12. The left edge of the seat 26 in the drawing provides a sealing face against a stationary trapped seal ring 30. A wave spring 42 urges the trapped seal ring 30 against the seal ring 24. The trapped seal ring 30 is sealed by an O-ring 32 to a gland 52. The gland 52 does not rotate but rather is fixed to the outer end housing 14. The gland 52 surrounds an outer seal wave spring 34 which biases an outer seal drive ring 36 in the direction shown to the left. The outer seal drive ring 36 traps an O-ring 40 and is pressed by the wave spring 34 so that the drive ring 36 urges a carbon seal 46 in the direction to the left as shown. The carbon seal 46 provides a secondary seal by abutting against a fixed outer seal seat 50 which traps an O-ring 48. Thus, the seal ring 30, O-ring 32 gland 52, outer seat 50, and O-ring 48 are non-rotating. The outer seal ring 34, outer seal drive ring 36, O-ring, 40 and carbon seal 46 rotate with the shaft 12.

Accordingly, it will be appreciated that rotating contact between the seat 14 (a rotating part) and the trapped seal ring 30 (a non-rotating part) provides a primary seal sealing the material which is surrounding the shaft 12 outwardly away from the region under the trapped seal ring 30. Also, contact between the rotating carbon seal 46 and the stationary outer seal seat 50 provides a secondary seal. It will be appreciated that an open region is defined between the primary and secondary seals, and between the rotating and non-rotating components, which area is generally not contaminated by the material being processed, nor by the bearings or any bearing lubricant or washing of the bearings that occurs. A barrier fluid, preferably water, is circulated in this region in some embodiments to cool and lubricate the primary seal, extending its useful life. The primary and secondary seal contain the barrier fluid. Also to some extent, the secondary seal also may prevent any material that may have bypassed the first seal from continuing further towards the shaft bearings (not shown to the left).

A non-rotating spring 42 is provided which urges the non-rotating trapped seal ring 30 to the right relative to the gland 52. Turn now particularly to FIGS. 4 and 5, it will be seen that the trapped seal ring 30 has a plurality of indentations or notches 70. The notches 70 are aligned with locations of holes 72 through the gland 52 and indentations or indentations notches 74 also in the gland 52. A ball 38 is inserted through the holes 72 and engage the indentations 74 and 70 in a locking fashion by contact of the ball with indentations when the assembly is assembled and released as illustrated in FIG. 3.

Figure 5:
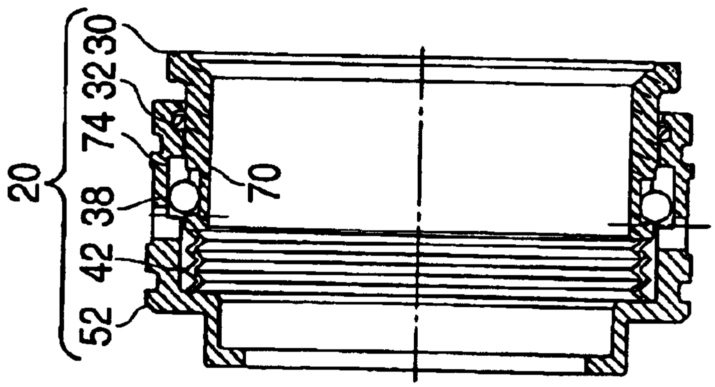
FIG. 5 is a side cross sectional view of the components of FIG. 4 shown in an assembled state.
Figure 4:
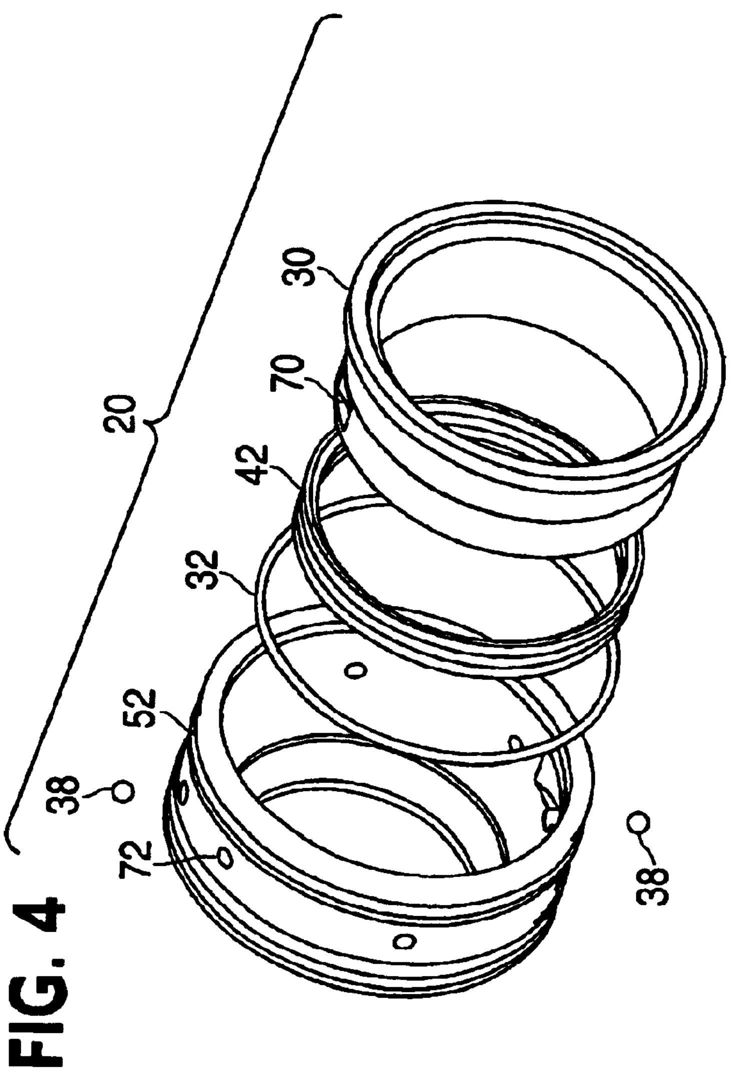
FIG. 4 is an exploded view of the parts making up a disassembled seal cartridge used in the preferred embodiment of the present invention.

FIGS. 4 and 5 show the disassembled seal cartridge assembly 20 and the method of assembly and disassembly of the seal cartridge 20 will now be described in more detail. It would be appreciated that the seal cartridge 20 provides an easily disassembled point which permits the end housing end 14 to be removed, followed by removal of the gland 52 from the trapped seal ring 4 when desired.

An example of assembly of the sealed cartridge 20 is as follows. First, the O-ring 32 is assembled into the interior channel in the gland 52 and lubricated. Next, the wave spring 42 is inserted into a channel in the gland 52. The gland 52 with the O-ring 32 and wave spring 42 inside are then pushed over the trapped seal ring 30 against the spring pressure. The ball indentation 70 and the trapped seal ring 30 are aligned with the ball slot opening 72 in the gland 52 and one ball is inserted radially inward through each hole. In order to fully insert the ball 38, the spring 42 must be compressed sufficiently so that the indentation 70 aligns with the hole 72.

When the spring pressure is released, the assembly moves to the configuration shown in FIG. 5, with the ball 38 radially and circumferentially trapped between the indentation 70 and the indentation 74. In this configuration, the entire assembly is locked against rotation relative to the other components. That is, because the ball 38 substantially fills the region between the indentations 70 and 74, the gland 52 and trapped seal ring 30 cannot rotate relative to each other.

The seal cartridge 20 can be disassembled by reversing the above steps, essentially by compressing the spring 42 and allowing each ball 38 to fall out one of the holes 72.

In a preferred embodiment a number of balls 38 and corresponding indentations 70 and 74 may be placed at equal circumferential diameters around the gland 52 and trapped seal ring 30. In a preferred embodiment, two opposed balls 38 have been found preferable. However, another number of preferably equally spaced balls 38 may be suitable. Additional holes 72, with or without corresponding indentations 74, can be provided to facilitate circulation of the barrier fluid if present. In order to reduce wear between the ball 38 and the indentation on the trapped seal ring, 30 it is preferred to make the trapped seal ring 30 of solid tungsten carbide. However the number of balls, indentations and holes can vary.

Figure 6:
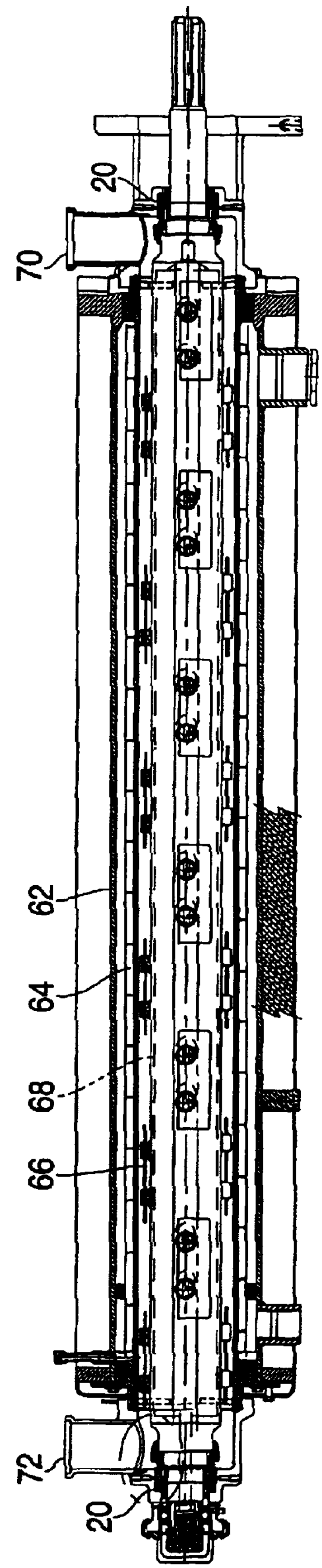
FIG. 6 is a schematic layout view of a scrape surface heat exchanger tube showing the inlet and the outlet as well as the locations of the seals at each end.

The implementation of a stainless steel ball 38 and a solid tungsten carbide material for the ring 30 is found to provide a satisfactorily small degree of angular play. In practice, this play has been found in some embodiments to be less than 15 degrees, which is satisfactory in many applications since the shaft is generally operated under load in only one direction at a time. FIG. 6 is a layout view of a scraped surface heat exchanger in which a seal cartridge 20 according to the present invention may be implemented. The heat exchanger has an outer housing 62 and an inner housing 64, with the ability to circulate a hot or cold material through the gap between these two cylinders 62 and 64. A number of hinged blades 66 are provided extending outwardly from a central rotating tube 68. As the tube 68 rotates it carries the blades 66 so that they scrape along the inside surface 64. The heat exchanger includes an end having an material inlet 70 and another end having a material inlet 72, and seal cartridges 20 according to the present invention can be provided as desired at one or both ends.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for sealing between a rotating shaft and a fixed housing, comprising:

a rotating seal having a first face, mounted for rotation with the shaft;

a non-rotating trapped seal ring having a second face in sliding contact with the first sealed face and biased towards the first face by a spring;

a gland fixedly mounted to the housing so that the spring is located between the gland and the trapped seal ring;

a ball disposed between the trapped seal ring and the gland and providing a lock against rotation so that the trapped seal ring remains rotationally fixed relative to the fixed gland; the gland further comprises a first indentation and the trapped seal ring further comprises a second indentation, and wherein the ball is trapped between the first and second indentations; and a port extending through the gland and permitting insertion of the ball from outside the gland into the region defined by the first and second indentations when the spring is compressed to a first degree, wherein when the spring is compressed to the first degree, insertion of the ball is permitted, and when the spring is uncompressed so that the first face contacts the second face, degree removal of the ball is prevented.

2. An apparatus according to claim 1, wherein the trapped seal ring is made from tungsten carbide.

3. A scraped surface heat exchanger apparatus comprising:

a rotating shaft;

a fixed housing;

a rotating seal having a first face, mounted for rotation with the shaft;

a non-rotating trapped seal ring having a second face in sliding contact with the first sealed face and biased towards the first sealed face by a spring;

a gland fixedly mounted to the housing so that the spring is located between the gland and the trapped seal ring, wherein the gland further comprises a first indentation and the trapped seal ring further comprises a second indentation, and wherein the ball is trapped between the first and second indentations;

a ball disposed between the trapped seal ring and the gland and providing a lock against rotation so that the trapped seal ring remains rotationally fixed relative to the fixed gland; and a port extending through the gland and permitting insertion of the ball from outside the gland into the region defined by the first and second indentations when the spring is compressed to a first degree, wherein when the spring is compressed to the first degree, insertion of the ball is permitted, and when the spring is uncompressed so that the first face contacts the second face, removal of the ball is prevented.

4. An apparatus according to claim 3, wherein the trapped seal ring is made from tungsten carbide.

5. An apparatus for sealing between a rotating shaft and a fixed housing, comprising:

a rotating sealing means having a first face mounted for rotation with the shaft;

a non-rotating sealing means trapped seal ring having a second face and sliding contact with the first face and biased towards the first face by a spring;

a gland fixedly mounted to the housing so that the spring is located between the gland and the trapped seal ring, wherein the gland further comprises a first indentation and the trapped seal ring further comprises a second indentation, and a ball trapped between the first and second indentations and providing a lock against rotation so that the trapped seal ring remains rotationally fixed relative to the fixed gland; and a port extending through the gland and permitting insertion of the ball from outside the gland into the region defined by the first and second indentations, wherein when the spring is compressed, insertion of the ball is permitted, and when the spring is uncompressed to some degree removal of the ball is prevented.

6. An apparatus according to claim 5, wherein the trapped seal ring is made from tungsten carbide.

7. A method for a sealing between a rotating shaft and fixed housing, comprising:

biasing a non-rotating seal face into sliding contact against a seal face rotating with the shaft using a spring; and locking the non-rotating seal face against rotation by insertion of a ball trapped between an indentation in a trapped seal ring and an indentation in a gland attached to the housing, wherein when the spring is compressed, insertion of the ball is permitted, and when the spring is uncompressed to some degree removal of the ball is prevented.

8. The method according to claim 7, wherein a port extends through the gland to permit insertion of the ball from outside the gland into the region defined by the first and second indentations.

* * * * *